United States Patent [19]

Beck, Jr.

[11] Patent Number: 4,627,330

[45] Date of Patent: Dec. 9, 1986

[54] UNITARY BEARING RETAINER FOR A SWASHPLATE BEARING

[75] Inventor: Richard Beck, Jr., Ames, Iowa

[73] Assignee: Sundstrand Corporation, Rockford, Ill.

[21] Appl. No.: 680,438

[22] Filed: Dec. 11, 1984

[51] Int. Cl.$^4$ ............................................. F01B 13/04
[52] U.S. Cl. ...................................... 92/12.2; 91/505; 384/576; 384/2 R
[58] Field of Search ................... 417/222; 92/12.2, 71; 91/504-506, 499, 487; 308/2 R, 3 C; 384/572-580

[56] References Cited

U.S. PATENT DOCUMENTS

| | | | |
|---|---|---|---|
| 2,371,974 | 3/1945 | Neuland | 91/505 X |
| 2,667,862 | 2/1954 | Muller | 92/12.2 X |
| 2,729,520 | 1/1956 | Ritchie et al. | 384/577 X |
| 3,396,670 | 8/1968 | Baits | 91/506 |
| 3,631,764 | 1/1972 | Lucien | 91/506 |
| 3,728,943 | 4/1973 | Lucien | 91/506 |
| 3,747,476 | 7/1973 | Ankeny et al. | 91/506 X |
| 4,029,367 | 6/1977 | Schwede et al. | 308/2 R |
| 4,449,445 | 5/1984 | Viles | 92/12.2 |
| 4,455,920 | 6/1984 | Shaw et al. | 92/12.2 |
| 4,508,011 | 4/1985 | Nolden | 91/506 |

FOREIGN PATENT DOCUMENTS

| | | | |
|---|---|---|---|
| 3000921 | 7/1981 | Fed. Rep. of Germany | 91/505 |
| 883347 | 3/1943 | France | 91/505 |
| 231918 | 4/1925 | United Kingdom | 91/503 |
| 231917 | 4/1925 | United Kingdom | 91/505 |
| 823626 | 4/1981 | U.S.S.R. | 91/505 |

OTHER PUBLICATIONS

Recknagel, F. W. "Now: Nylon Parts for Ball Bearings." *Product Engineering*, (Feb., 1952), pp. 119-123.
In a Company Brochure, "Unit Cages," p. 14 and p. 116.

*Primary Examiner*—William L. Freeh
*Assistant Examiner*—Paul F. Neils
*Attorney, Agent, or Firm*—James A. Wanner; Ted E. Killingsworth; Harold A. Williamson

[57] ABSTRACT

The invention is directed to a unitary cage assembly annularly positioning a plurality of rollers in a pair of roller bearings supporting a cradle swashplate. By utilizing the unitary cage assembly, a parallel relationship between the rollers is assured and, furthermore, only a single locating mechanism for the unitary cage assembly is required.

18 Claims, 4 Drawing Figures

UNITARY BEARING RETAINER FOR A SWASHPLATE BEARING

FIELD OF THE INVENTION

The invention relates to a unitary bearing cage used for plural spaced apart roller bearings supporting a tiltable swashplate of a variable displacement hydraulic unit and which requires the use of only a single bearing cage locating means.

BACKGROUND OF THE INVENTION

Axial piston variable displacement hydraulic units utilize a tiltable swashplate to control the displacement of pistons within a rotating cylinder block. One common type of tiltable swashplate is a cradle type swashplate which is supported at one end of the housing by a pair of arcuate bearings having rolling elements. This pair of roller bearings are spaced apart in a transverse plane to permit the passage of a shaft coupled to the cylinder block. Each of the pair of roller bearings is provided with a retainer locating the individual rollers of the bearing. Common roller bearing practice requires that the arcuate displacement of the roller bearing cage be one half of the arcuate displacement of the cradle swashplate in order to obtain an exclusively rolling motion of the roller elements. Furthermore, since the roller bearings are arcuate, but not totally circular, repeated tilting of the swashplate can lead to slipping of the roller elements between the housing and the cradle swashplate to positions other than the desired optimum support positions for resisting the axial thrust of the swashplate.

In order to assure that the part arcuate roller bearings do not slip to an adverse position, limit stops have been secured to either the swashplate or the housing such as taught in Lucien U.S. Pat. No. 3,631,764. However, this solution does not assure the desired one half displacement relationship of the bearing cage relative to the swashplate. Therefore, locating means which do provide such one half displacement relationship have been provided. These locating means can be gears such as taught in Baits U.S. Pat. No. 3,396,670, pivotal pins such as taught in Schwede et al U.S. Pat. No. 4,029,367, or pivotal levers such as taught in British Pat. No. 231,917 issued Apr. 7, 1925. However, since there are a pair of roller bearings involved, each of these prior art solutions require the use of a pair of spaced apart locating means for the respective roller bearing cages. This duplicates the expense of the locating means and, furthermore, unduly complicates the assembly of the unit.

It is furthermore known in the general roller bearing art to place two roller bearing assemblies in side by side relationship with a single cage acting as a retainer for the rollers of both bearing assemblies. Such cages have been formed of both steel and plastic. In the latter form, two plastic retainers of a linear or flat double row bearing are joined by two thin plastic webs permitting the pair of rows to be bent to a desired angle between each other.

SUMMARY OF THE INVENTION

The present invention is directed to the use of a plurality of spaced apart arcuate roller bearings to support the swashplate of a variable displacement hydraulic unit relative to its housing with cage means locating the individual rotating elements of the plurality of spaced apart bearings, but wherein the cage means for both bearings as a unitary assembly which reduces the bearing cost and simplifies assembly. This furthermore achieves the object of using a single cage to assure that the roller bearing elements of the spaced apart bearings act in parallel.

Another object of the invention is to use a unitary cage means for the spaced apart bearing assemblies in a manner which requires only one cage locating means for the bearing assemblies. This not only reduces the assembly steps required but also halves the cost of the bearing cage locaters. Another object is to locate the single bearing cage locating means adjacent one side of the swashplate so that a single housing cover is needed for access to the locating means.

A still further object of the present invention is to provide a variable displacement hydraulic unit comprising a housing, a cylinder block mounted in the housing for rotation about a central axis, the cylinder block having a plurality of axial cylinders therein each containing a reciprocating piston, a swashplate for controlling the displacement of the pistons within the cylinders, means for tiltably supporting the swashplate in the housing, and positioning means for controlling the tilt of the swashplate relative to the housing, the support means comprising at least two spaced apart sets of rollable bearing elements positioned between the swashplate and the housing, means constraining the bearing elements to a rolling motion in a generally arcuate path, and constraining means including a unitary bearing cage assembly for retaining the bearing elements of at least two of the sets.

DETAILED DESCRIPTION OF THE PREFERRED EMBODIMENTS

Figure 1:
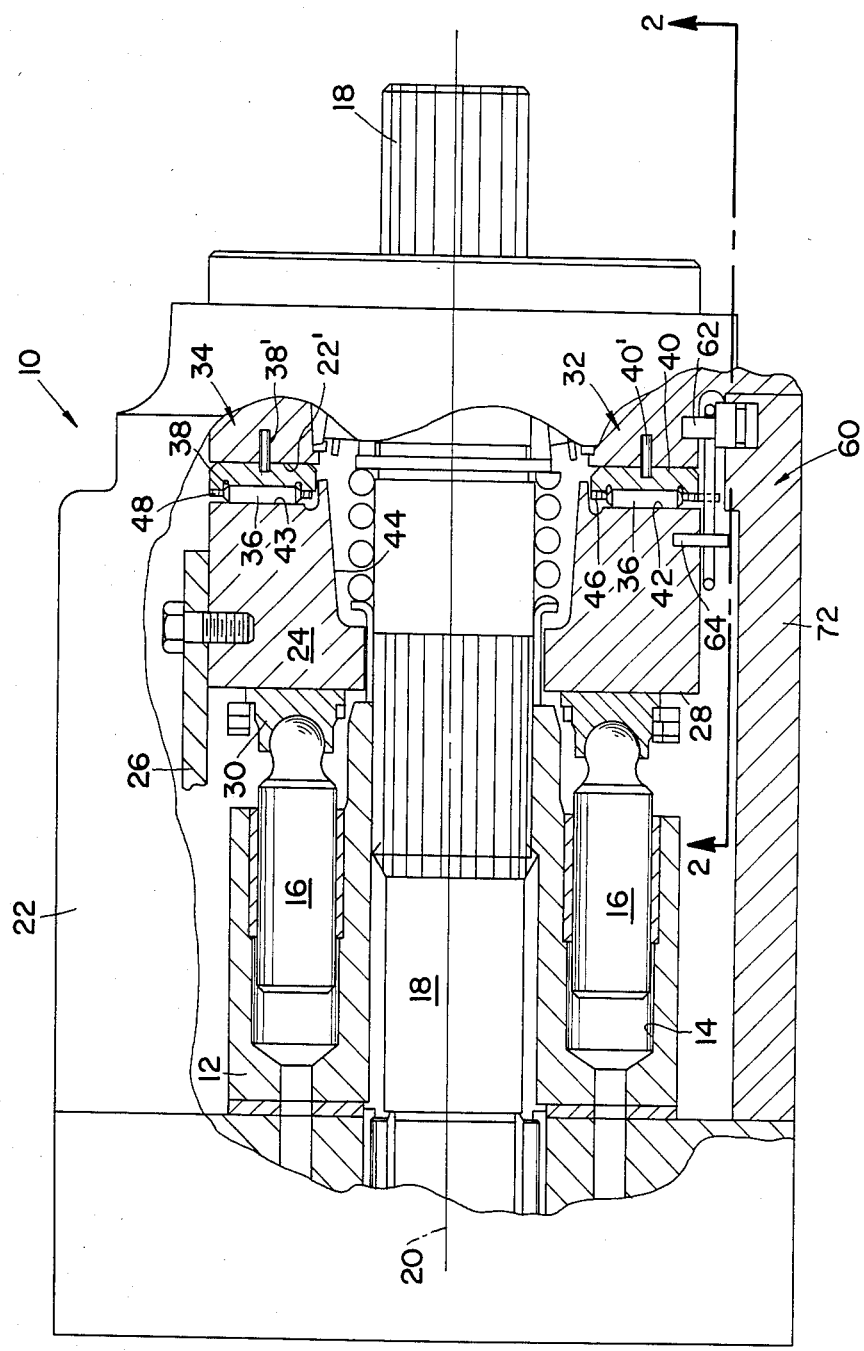
FIG. 1 is a sectional view of a hydraulic unit utilizing the unitary bearing cage of the present invention.

The unitary bearing cage assembly of the present invention is used in a variable displacement hydraulic unit 10 shown in FIG. 1. The hydraulic unit may be either a pump or a motor and has a rotatable cylinder block 12 with a plurality of cylinder bores 14 with reciprocating pistons 16 therein. The cylinder block is secured to a shaft 18 and rotates about a central axis 20. Located at one end of a housing 22 is a cradle swashplate 24 which is adapted for tilting or pivotal movement induced by input mechanism represented by lever 26. The swashplate has a planar cam surface 28 engaged by piston slippers 30 so that the tilting movement of the swashplate 24 controls the axial displacement of the pistons 16.

The cradle swashplate 24 is mounted on the housing 22 by a pair of roller bearing assemblies 32 and 34. Each of the roller bearing assemblies has a plurality of rollable elements such as rollers 36. Each of the roller bearing assemblies 32 and 34 may also be provided with an outer race such as 38 and 40 secured to arcuate portions 22' of the housing by pins 38' and 40'. However, it is also known in such bearings to have the rollers 36 directly engage the arcuate portions 22' of the housing 22 without utilizing outer races. Generally, an inner race is not utilized and the rollers 36 directly engage a pair of outwardly facing arcuate portions 42 and 43 of the swashplate 24. The cradle swashplate 24 is provided with a central opening 44 which permits passage of the shaft 18 through the center of the swashplate. Furthermore, also to prevent interference with the shaft 18, the bearing assemblies 32 and 34 must be spaced apart by a distance greater than the width of the opening 44 so that each sets of rollers can engage a substantial arcuate portion of the swashplate 24.

In order to maintain arcuate spacing between the individual rollers 36, the bearing assemblies 32 and 34 are provided with retainers 46 and 48 which act as individual roller cages for the respective bearings 32 and 34. Each of the retainers 46 and 48 are provided with a plurality of slots 50 which arcuately locate the individual rollers 36.

Figure 3:
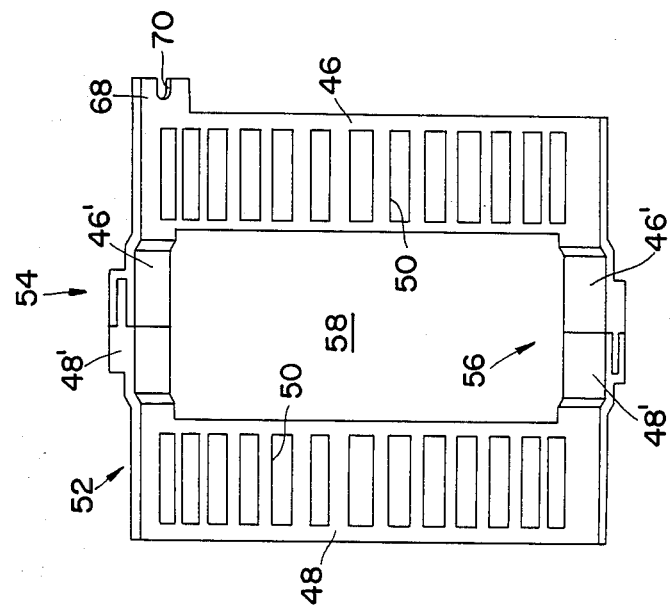
FIG. 3 is an orthographic projection showing one form of the unitary bearing cage of the present invention.
Figure 4:
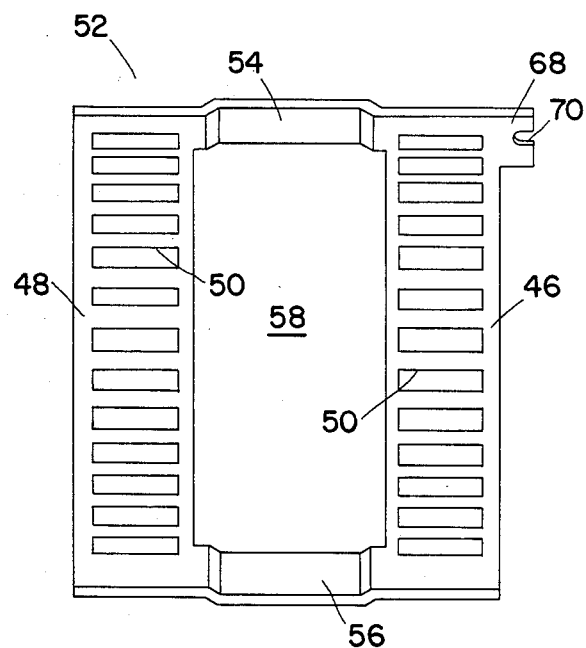
FIG. 4 is an orthographic projection showing an alternate single piece form of the unitary bearing cage.

In the present invention, the pair of arcuate retainers 46 and 48 are joined together to form a unitary cage assembly 52 as shown in FIGS. 3 and 4. In the FIG. 4 preferred form of practicing the invention, the unitary cage assembly 52 is formed of a single piece of material having cross members 54 and 56 join the individual retainers 46 and 48 adjacent the ends of the retainers. In the FIG. 3 form of practicing the invention, each of the retainer sections 46 and 48 have a pair of inwardly directed transverse legs 46' and 48' joined together by tongue and groove joints to form the cross members 54 and 56. Still another form contemplated is having each of the pair of retainers 46 and 48 joined by separately formed cross members 54 and 56 being secured to the pair of retainers 46 and 48 to form the unitary cage assembly 52. In all preferred forms of practicing the invention, the spaced apart retainers 46 and 48, along with the transverse cross members 54 and 56, provide a large central opening 58 as seen in FIG. 3 which permits passage of the shaft 18 to the exterior of the housing 12.

While the bearing cage assembly 52 may be formed of many materials, it had been found particularly advantageous to form the cage 52 from a plastic such as hard nylon. This permits limited radial deformation of the cage while still providing sufficient strength to assure the proper arcuate spacing between the slots 50 which locate the rollers 36, and also maintain proper parallel spacing between retainers 46 and 48. Also a plastic cage reduces the friction between the cage and the hardened steel rollers.

The unitary cage assembly 52, with the retainers 46 and 48 joined by the cross members 54 and 56, assures that the retainers are in parallel alignment both during assembly and operation of the hydraulic unit 10. Also, it has been determined that the manufacturing cost of the unitary cage, especially when formed by two pieces such as shown in FIG. 3, is no more expensive than forming a pair of individual retainers, and thus the advantage of assuring parallel alignment of the retainers 46 and 48 is obtained with little or no extra cost.

Figure 2:
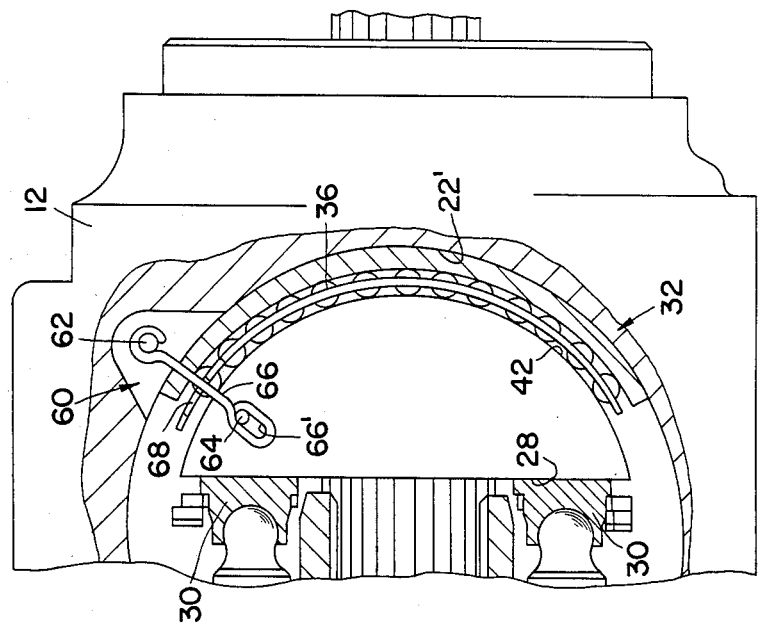
FIG. 2 is a partial sectional view taken along the lines 2—2 of FIG. 1 showing the relationship between the swashplate, housing, and bearing cage locating means.

As in all roller bearings, it is desirable that the movement of the roller retainer or cage be one half the relative movement of the supported or supporting parts. Thus, in a cradle swashplate environment, such as in the present invention, it is desirable that the cage 52 be limited to arcuate movement that is one half the arcuate movement of the swashplate 24. This arcuate movement relationship is assured by a single locating means 60, such as taught in FIGS. 1 and 2.

The locating means 60 can take many forms as discussed in the background of the invention. One simple and inexpensive form found desirable consists of a pivot pin 62 secured to the housing 12, a pivot pin 64 secured to the swashplate 24, and a link 66 means interconnecting the pins 62 and 64. At one of the pivot points, a loss motion means is provided such as by elongated slot 66' where the link engages pin 64 on the swashplate 24. One inexpensive means providing the link 66 is a bent wire form. Extending outwardly from the cage 52 is a tab 68 having a slot 70 which engages the central portion of the link 66. Thus, as the swashplate 24 tilts or pivots on the roller bearing assemblies 32 and 34, the relative movement between pin 62 and 64 causes a separate pivotal movement of link 66 which either aids or limits the arcuate movement of the cage 52 as the slot 70 slides on the link. The proper spacing between pins 62 and 64 relative to the tab 68, generally the distance between pin 62 and tab 68 being twice the distance between the pin 64 and the tab 68 when the swashplate 24 is centered, provides the desired two to one relationship between the arcuate movement of the swashplate 24 and the arcuate movement of the cage 52.

By utilizing the unitary cage assembly 52, only one locating means 60 is required to properly arcuately locate both retainers 46 and 48. It has been found particularly desirable to locate the retaining means 60 on one side of the swashplate 24 such as seen in the lower right hand corner of FIG. 1. With such location of the locating means 60, a removable housing side cover 72 can be used to provide ready access to the locating means 60 to facilitate the link 66 being positioned over pin 64, into slot 70 and secured to the pin 62 fastened on the housing 12 after the rotating block and swashplate of the hydraulic unit has been assembled. Since there is only one locating means 60, there is no necessity for having other access to the interior cavity of the housing for assembly of the locating means.

It can be seen from the above description that the present invention meets the objectives of providing an inexpensive and readily assembled roller bearing assembly supporting a pivotable or tiltable swashplate in a hydraulic unit. Furthermore, the present invention requires the use of only one locating means to properly position the roller retainers for a pair of parallel spaced apart roller bearing assemblies spanning a shaft passing between the roller bearing assemblies. The unitary roller bearing cage assembly as specifically described above is merely illustrating of the preferred form of practicing the present invention and is not intended to limit the scope of the present invention.

I claim:

1. A variable displacement hydraulic unit comprising a housing, a cylinder block mounted in said housing for rotation about an axis, said cylinder block having a plurality of axial cylinders therein each containing a reciprocating piston, a swashplate for controlling the displacement of said pistons within said cylinders, a rotatable shaft connected to said cylinder block and extending along said axis through an opening formed in said swashplate, support means for tiltably supporting said swashplate in said housing, and positioning means for controlling the tilt of said swashplate relative to said housing, said support means comprising at least two spaced apart sets of rollable bearing elements positioned between said swashplate and said housing with said shaft extending between said at least two of said sets of bearing elements, means constraining said bearing elements to a rolling motion in a generally arcuate path, said constraining means including a unitary bearing cage assembly for retaining said bearing elements of at least two of said sets.

2. The hydraulic unit of claim 1 wherein said unitary bearing cage assembly comprises a first retainer element having a plurality of aligned slots for retaining said bearing elements of one of said sets of bearing elements, a second retainer element having aligned slots for retaining bearing elements of a second of said sets bearing elements, said first and second retaining elements being in parallel relationship and joined by a pair of cross members one adjacent each end of said retaining elements so as to form a large opening between said retaining elements through which said shaft passes.

3. The hydraulic unit of claim 2 wherein said unitary cage consisting of said retainers and said cross members are formed from a single piece of material.

4. The hydraulic unit of claim 2 wherein said first and second retainers are formed of separate elements and then joined together to form said unitary cage assembly.

5. The hydraulic unit of claim 2 wherein said unitary cage is made of nylon.

6. The hydraulic unit of claim 1 wherein a single locating means is provided for positioning said cage in said generally arcuate path in response to tilting movement of said swashplate whereby said bearing elements in said at least two of said sets are constrained by said single locating means acting through said unitary cage.

7. The hydraulic unit of claim 6 wherein said housing has a side cover for providing access to one side of said hydraulic unit, said locating means being in part mounted on said housing adjacent to said side cover.

8. The hydraulic unit of claim 6 wherein said locating means comprising a first part forming a pivot on said housing, a second part forming a pivot on said swashplate, link means interconnecting said first and second parts, and link receiving means formed on said unitary cage engaging said link.

9. The hydraulic unit of claim 8 wherein said link receiving means comprises a slot slidably engaging said link to arcuately position said cage.

10. The hydraulic unit of claim 8 wherein at least one of said pivots includes lost motion means.

11. A variable displacement hydraulic unit comprising a housing, a cylinder block mounted inside said housing for rotation about an axis, said cylinder block having a plurality of axial cylinders therein each containing a reciprocating piston, a cradle swashplate having a cam surface cooperating with said pistons to control the displacement of the pistons within said cylinders, said swashplate having a central opening, a rotatable shaft connected to said cylinder block and extending along said axis through said opening formed in said swashplate, a pair of arcuate bearing surfaces formed on such swashplate on a face opposite said cam surface with said pair of bearing surfaces being located one on each side of said shaft opening formed in said swashplate, a pair of support means comprising a pair of spaced apart sets of roller bearing elements positioned between said swashplate and an arcuate portion of said housing and cooperating with said pair of swashplate arcuate bearing surfaces to support said cradle swashplate relative to said housing, and a unitary bearing cage having a pair of parallel retainers each containing slots engaging and positioning said bearing elements of one of said pair of sets of bearing elements to arcuately position said bearing elements between said swashplate bearing surface and said housing bearing surface, said bearing cage further comprising a pair of spaced apart cross members joining said pair of retainers in parallel relationship, said pair of cross members and said pair of retainers forming an opening which is in general alignment with said swashplate opening and permits the passage of said rotating shaft when said unitary bearing cage is positioned between said swashplate arcuate bearing surface and said housing arcuate portion.

12. The hydraulic unit of claim 11 wherein said unitary cage consisting of said pair of retainers and said pair of cross members is formed from a single piece of plastic material.

13. The hydraulic unit of claim 11 wherein each end of said first and second retainers is formed with transverse extending legs, said legs, when joined together, forming said pair of cross members positioning said retainers in parallel relationship.

14. The hydraulic unit of claim 13 wherein said unitary bearing cage is made of nylon.

15. The hydraulic unit of claim 11 wherein a single locating means is provided for positioning said unitary cage in a generally arcuate path in response to a tilting arcuate movement of said swashplate, said single locating means providing arcuate movement of said cage that is approximately one half the arcuate movement of said swashplate.

16. The hydraulic unit of claim 15 wherein said housing has a side cover for providing access to one side of hydraulic unit, said locating means being in part mounted on said housing adjacent to said side cover.

17. The hydraulic unit of claim 15 wherein said locating means comprises a first part forming a pivot on said housing, a second part forming a pivot on said swashplate, at least one of said pivots including a lost motion means, link means interconnecting said first and second parts, and link receiving means formed on said unitary cage engaging said link.

18. The hydraulic unit of claim 17 wherein said link receiving means comprises a slot slidably engaging said link to arcuately position said cage.

* * * * *